(12) United States Patent
Matsui et al.

(10) Patent No.: US 10,879,824 B2
(45) Date of Patent: Dec. 29, 2020

(54) MOTOR CONTROL APPARATUS, IMAGE FORMING APPARATUS, AND METHOD FOR CONTROLLING MOTOR CONTROL APPARATUS

(71) Applicant: CANON KABUSHIKI KAISHA, Tokyo (JP)

(72) Inventors: Ken Matsui, Tokyo (JP); Jumpei Ashida, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/217,781

(22) Filed: Dec. 12, 2018

(65) Prior Publication Data

US 2019/0187598 A1 Jun. 20, 2019

(30) Foreign Application Priority Data

Dec. 19, 2017 (JP) .................................. 2017-242875

(51) Int. Cl.
*H02P 6/08* (2016.01)
*H02P 8/14* (2006.01)
*H02P 6/34* (2016.01)

(52) U.S. Cl.
CPC .................. *H02P 8/14* (2013.01); *H02P 6/08* (2013.01); *H02P 6/34* (2016.02)

(58) Field of Classification Search
CPC .. H02P 8/14; H02P 21/22; H02P 6/183; H02P 6/185; H02P 21/18; H02P 21/32; H02P 6/08; H02P 6/34
See application file for complete search history.

(56) References Cited

U.S. PATENT DOCUMENTS

| | | | | |
|---|---|---|---|---|
| 6,242,885 B1* | 6/2001 | Ide | ......................... | H02P 21/22 318/805 |
| 6,683,428 B2* | 1/2004 | Pavlov | ..................... | H02P 21/13 318/432 |
| 6,798,156 B2* | 9/2004 | Boscolo | .................... | H02P 6/14 318/400.01 |
| 8,159,161 B2* | 4/2012 | Tomigashi | .............. | H02P 6/183 318/400.01 |
| 8,331,141 B2* | 12/2012 | Shukh | ..................... | H01L 43/08 365/148 |
| 2013/0342125 A1* | 12/2013 | Eom | ....................... | H05B 45/14 315/223 |

FOREIGN PATENT DOCUMENTS

| | | |
|---|---|---|
| JP | 2008220169 A | 9/2008 |
| JP | 2014147239 A | 8/2014 |
| JP | 2015213398 A | 11/2015 |

* cited by examiner

*Primary Examiner* — Rina I Duda
(74) *Attorney, Agent, or Firm* — Carter, DeLuca & Farrell LLP

(57) ABSTRACT

A rotation speed of a motor is estimated based on a current value of the motor, and rotation control on the motor is performed at a first cycle. Processing for detecting a loss of synchronism in the motor based on the current value is performed at a second cycle that is shorter than the first cycle.

20 Claims, 7 Drawing Sheets

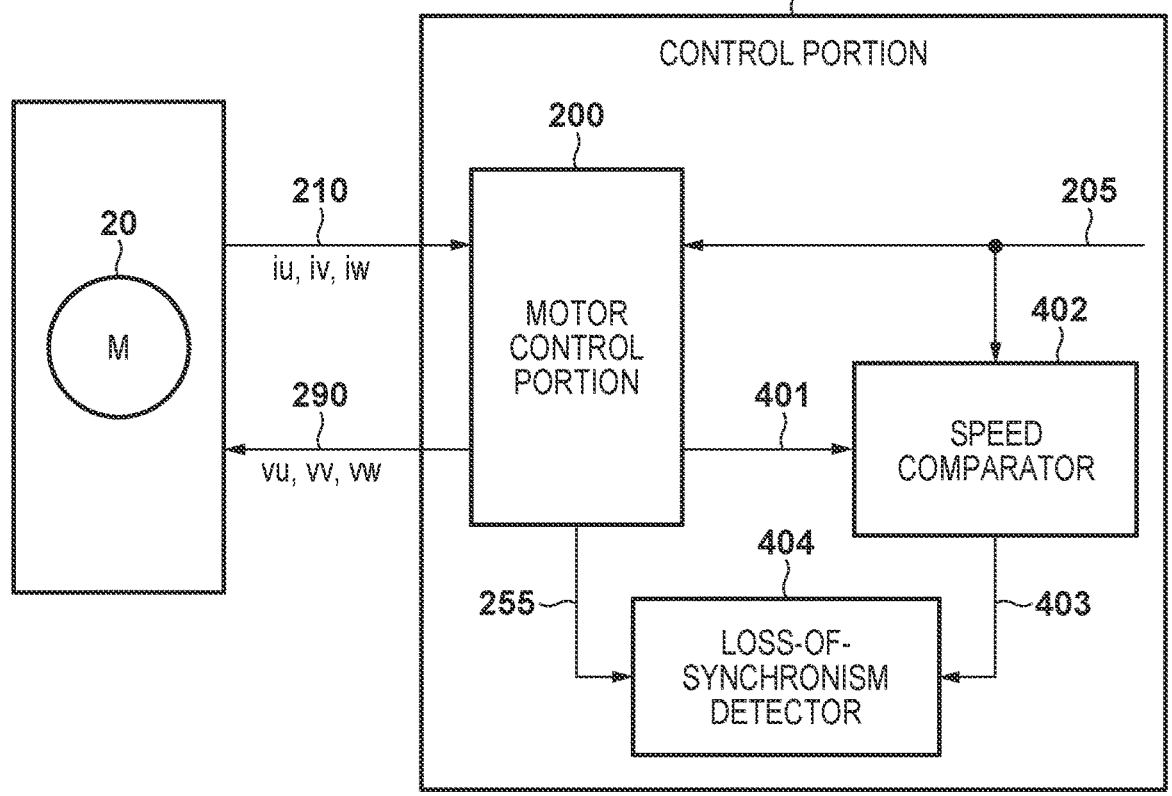
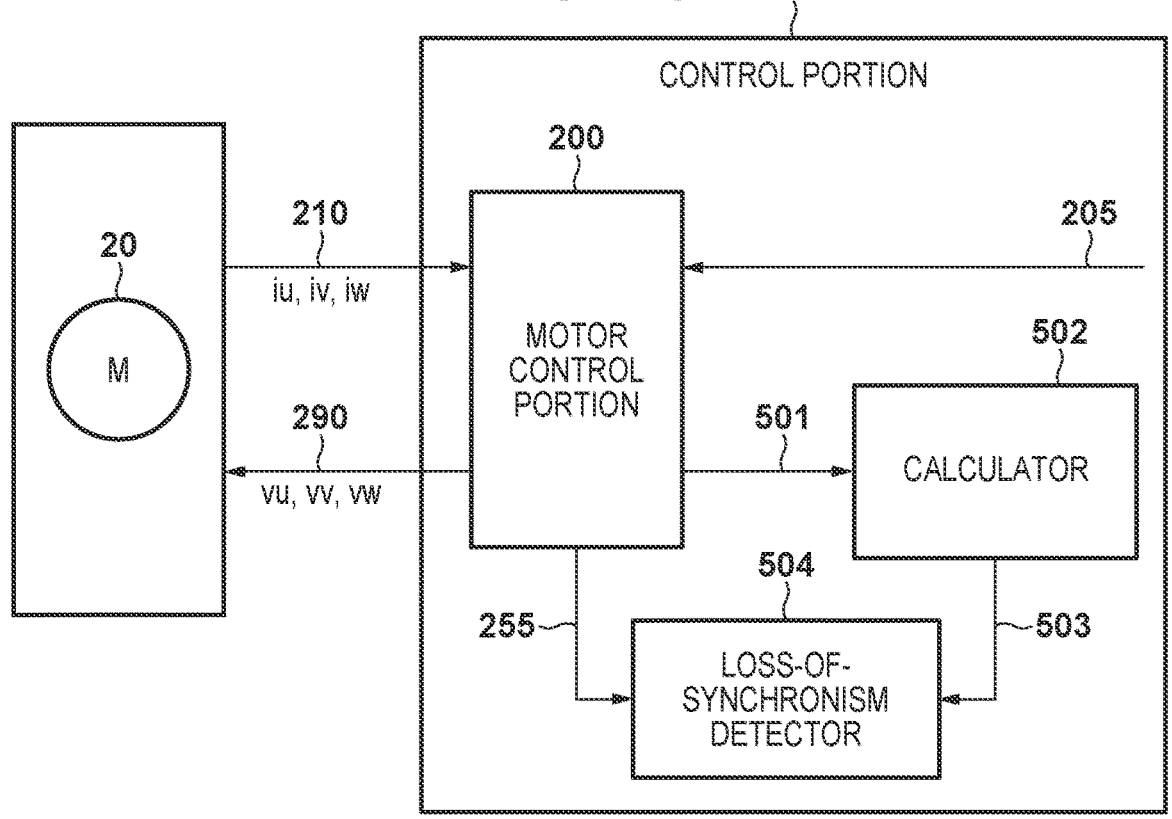

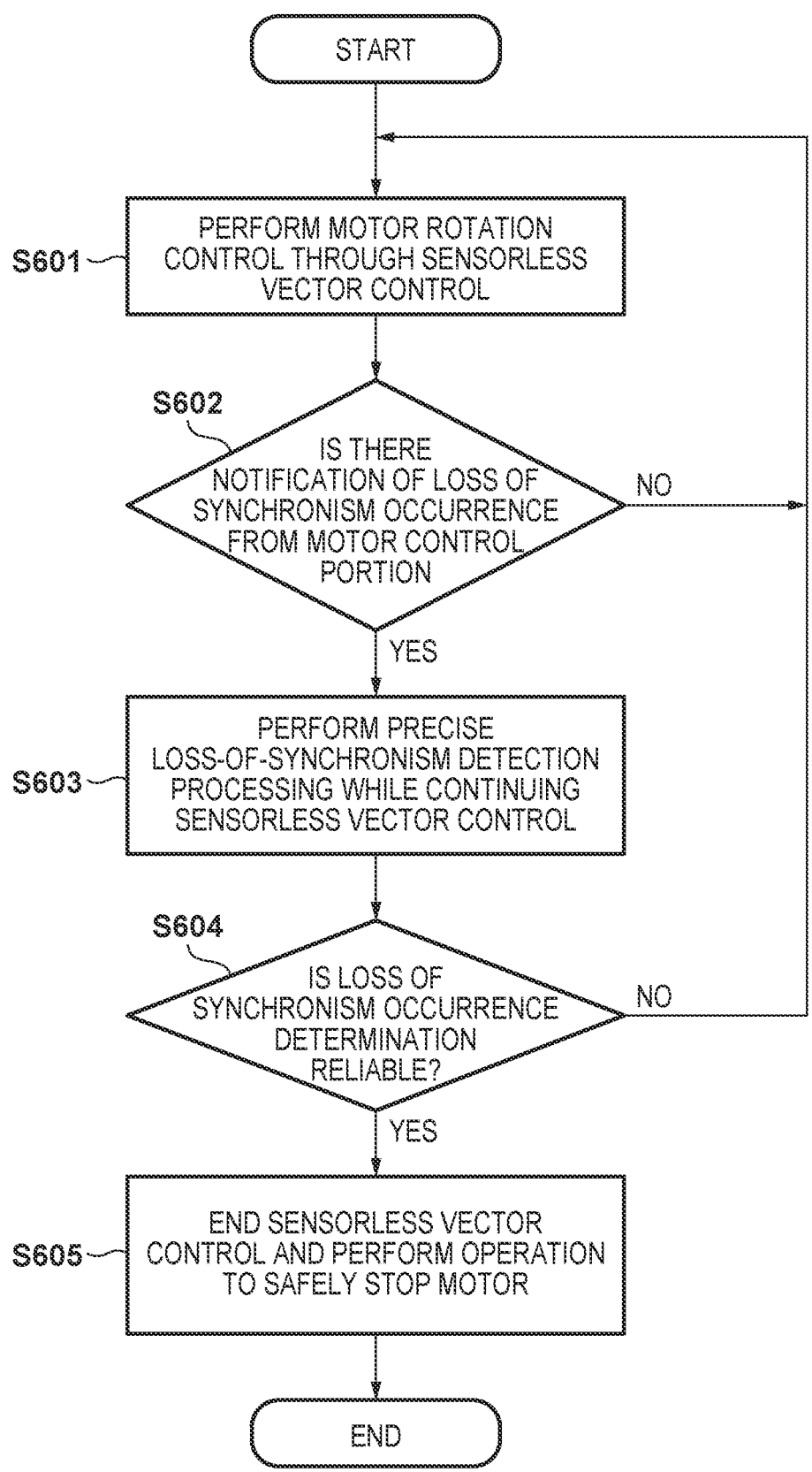

MOTOR CONTROL APPARATUS, IMAGE FORMING APPARATUS, AND METHOD FOR CONTROLLING MOTOR CONTROL APPARATUS

BACKGROUND OF THE INVENTION

Field of the Invention

The present invention relates to a motor control technique.

Description of the Related Art

In laser beam printers, a brushless DC motor or the like is used to drive a photoconductive drum and a transfer belt. In general, the brushless DC motor includes a three-phase stator that has a U phase, a V phase, and a W phase. The motor is rotated by controlling the voltage applied to the stator. At this time, stable rotation is achieved by detecting the rotational speed that varies according to the load or the like, and providing feedback to the control. Rotation speed is conventionally measured using a hall sensor or the like, but following improvements in the performance of control processors, a method (sensorless vector control) of estimating the rotation speed from three phase current values without using a sensor has come into wide use in recent years (for example, Japanese Patent Laid-Open No. 2015-213398).

In the sensorless vector control, a state estimation model that is suited to the load response characteristics of the motor is used to estimate the speed. At this time, when the load applied to the motor varies suddenly, a loss of synchronism may occur due to failing to perform an appropriate state estimation. Control of the motor such as stopping rotation cannot be performed unless measures are taken to address the loss of synchronism, and it is therefore necessary to quickly detect the occurrence of a loss of synchronism. In a laser beam printer, in particular, the load applied to the motor may vary suddenly due to a paper jam, intrusion of a foreign object, or the like, which may result in a loss of synchronism in the motor. The occurrence of a loss of synchronism may cause damage to paper, or cause an excessive current to flow, and it is therefore desirable to detect a loss of synchronism as quickly as possible.

On the other hand, in the case where the sensorless vector control is realized using software, the processor requires a large amount of computational power, and it is therefore desirable to realize the loss-of-synchronism detection, using a relatively simple computation. For this reason, for example, Japanese Patent Laid-Open No. 2008-220169 discloses a technique in which, with respect to the motor rotation speed, whether or not the motor is in a loss-of-synchronism state is simply determined by comparing estimation values estimated through sensorless vector control and approximate calculation values obtained assuming that the motor is rotating normally.

However, with the method disclosed in Japanese Patent Laid-Open No. 2008-220169, it is not possible to detect a loss of synchronism at a cycle shorter than the control cycle of the sensorless vector control. In the case of the sensorless vector control, in particular, under circumstances where the current values contain a relatively large noise component, measurement is desirably performed at least several tens of times to statistically remove the effect of the noise component. That is, in order to perform loss-of-synchronism detection as quickly as possible, it is required that a loss of synchronism is determined at an even shorter cycle.

SUMMARY OF THE INVENTION

The present invention provides a technique for quickly detecting a loss of synchronism in the motor.

According to the first aspect of the present invention, there is provided a motor control apparatus comprising: a control unit configured to estimate a rotation speed of a motor based on a current value of the motor, and perform rotation control on the motor at a first cycle; and a detection unit configured to perform processing for detecting a loss of synchronism in the motor based on the current value at a second cycle that is shorter than the first cycle.

According to the second aspect of the present invention, there is provided an image forming apparatus comprising: a motor; and a motor control apparatus including: a control unit configured to estimate a rotation speed of the motor based on a current value of the motor, and perform rotation control on the motor at a first cycle; and a detection unit configured to perform processing for detecting a loss of synchronism in the motor based on the current value at a second cycle that is shorter than the first cycle.

According to the third aspect of the present invention, there is provided a method for controlling a motor control apparatus, the method comprising: estimating a rotation speed of a motor based on a current value of the motor, and performing rotation control on the motor at a first cycle; and performing processing for detecting a loss of synchronism in the motor based on the current value at a second cycle that is shorter than the first cycle.

Further features of the present invention will become apparent from the following description of exemplary embodiments (with reference to the attached drawings).

BRIEF DESCRIPTION OF THE DRAWINGS

FIG. 4 is a block diagram showing a functional configuration example of the functional portions that execute high accuracy loss-of-synchronism detection processing.

FIG. 5 is a block diagram showing a functional configuration example of the functional portions that perform loss-of-synchronism detection processing based on frequency components.

FIG. 6 is a flowchart illustrating operations performed by a control portion 120.

DESCRIPTION OF THE EMBODIMENTS

Hereinafter, embodiments according to the present invention will be described with reference to the accompanying drawings. Each embodiment given below shows an example in which the present invention is specifically carried out, and is merely a specific example of the configuration recited in the appended claims.

First Embodiment

Figure 1:
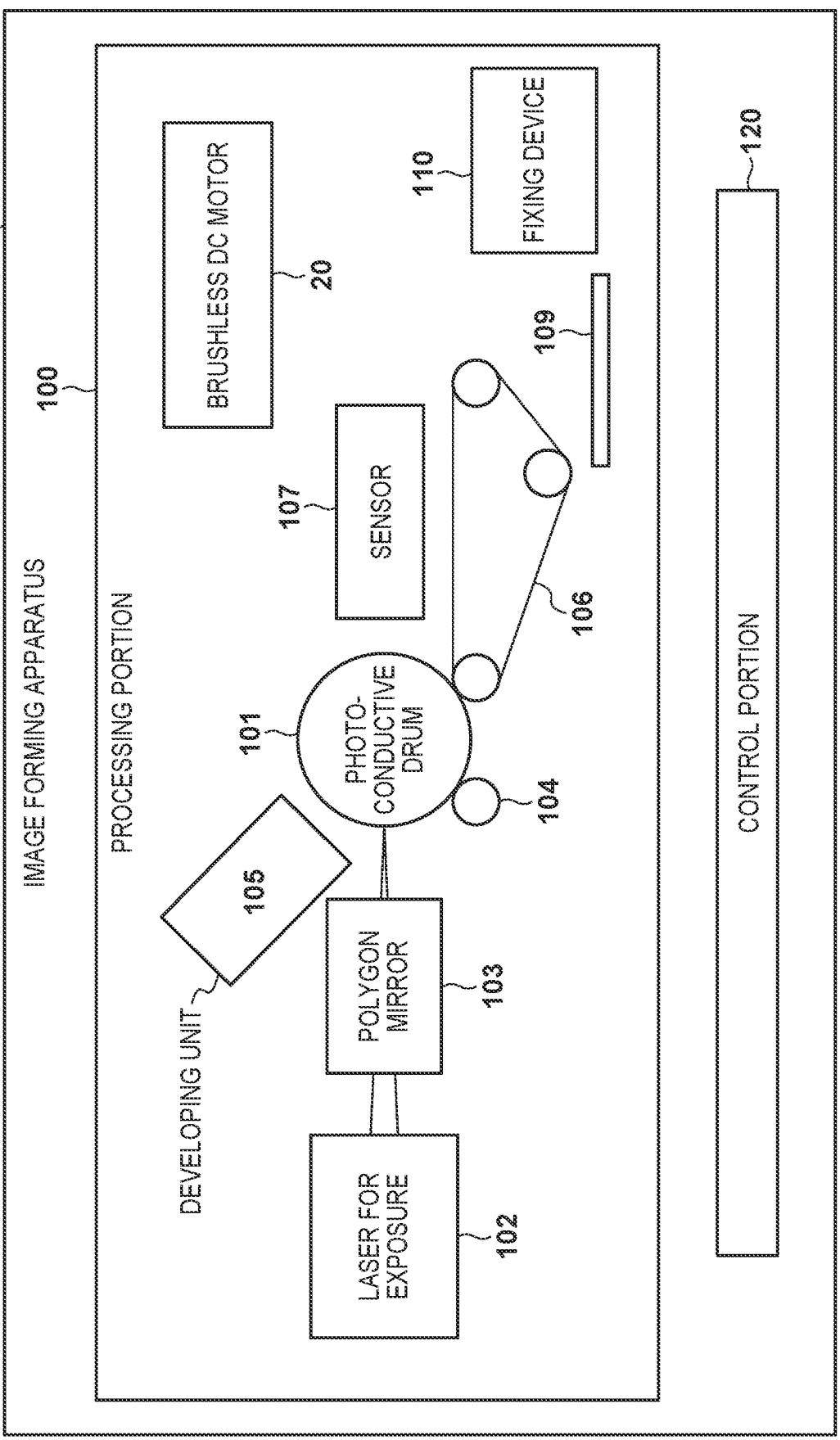
FIG. 1 is a block diagram showing a hardware configuration example of an image forming apparatus.

First, a hardware configuration example of an electrophotographic image forming apparatus according to the present embodiment will be described with reference to the block diagram shown in FIG. 1. As shown in FIG. 1, an image forming apparatus 10 according to the present embodiment includes a processing portion 100 and a control portion 120. FIG. 1 shows main constituent elements that are related to the following description, and thus the illustration of constituent elements (for example, functional portions related to a power supply) that are not mentioned in the following description is omitted. That is, FIG. 1 does not show all constituent elements of the image forming apparatus. In addition, the constituent elements shown FIG. 1 are merely an example of the constituent elements that can realize the operations described below, and can be modified/changed as appropriate.

First, the processing portion 100 will be described. A charging roller 104 charges the surface of a photoconductive drum 101. A laser 102 for exposure emits a light beam such as a laser light, and the light beam is applied to the photoconductive drum 101 functioning as an image carrier via a polygon mirror 103, as a result of which an electrostatic latent image is formed on the photoconductive drum 101. The electrostatic latent image formed on the photoconductive drum 101 by the light beam is developed (a toner image is formed) by a developing unit 105 using toner, and the toner image is temporarily transferred onto a transfer belt 106, and then transferred to printing paper (sheet) 109 conveyed. The printing paper 109 onto which the toner image has been transferred is conveyed to a fixing device 110. The fixing device 110 fixes the toner on the printing paper 109 onto which the toner image has been transferred. A sensor 107 captures an image of the toner image on the transfer belt 106, and the captured image is used in calibration of the amount of toner or chromatic distortion (in the case of a color printer), or the like.

The rotation of the photoconductive drum 101 and the conveyance using the transfer belt 106 are performed by a brushless DC motor (M) 20, and the operational control (rotation control) of the brushless DC motor 20 is performed by the control portion 120. Normally, the brushless DC motor 20 is a motor that is rotated at a desired rotation speed by controlling the voltage applied to a three-phase stator. In the present embodiment, as an example, three phase current values are acquired, and the brushless DC motor 20 is controlled through sensorless vector control using the acquired three phase current values.

Next, the control portion 120 will be described. The control portion 120 controls the operations of the processing portion 100 (various types of image forming processes such as charging, exposure, development, transfer, and fixing), and also controls the overall operations of the image forming apparatus 10. The control portion 120 includes hardware including at least one processor and a custom LSI, and a memory that stores data and computer programs executed by the processor. The processor of the control portion 120 executes processing using the computer programs and data stored in the memory, and thereby realizes corresponding functions.

Figure 2:
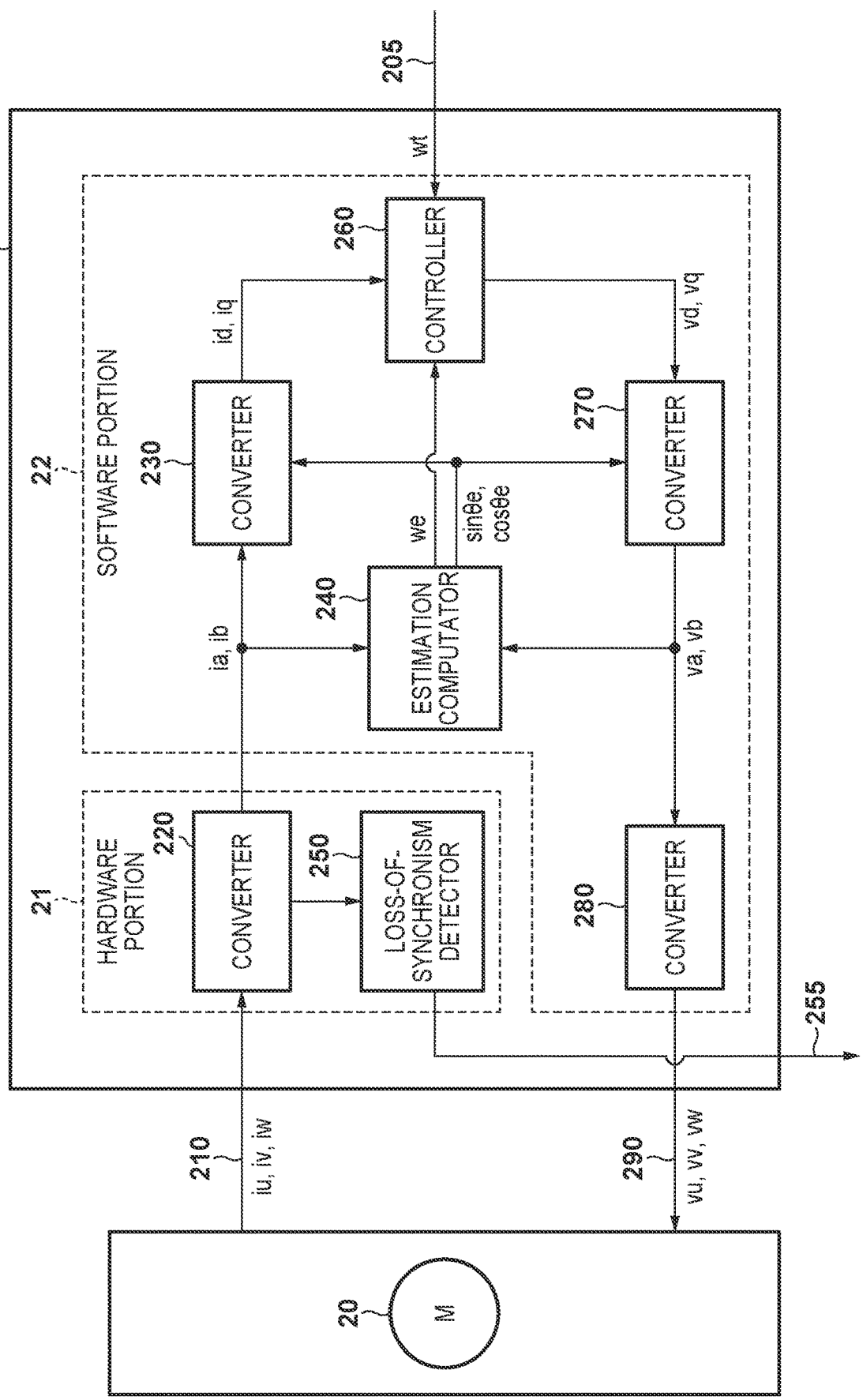
FIG. 2 is a block diagram showing a functional configuration example of a motor control portion 200.

Next, a functional configuration example of a motor control portion 200 included in the control portion 120 will be described with reference to the block diagram shown in FIG. 2. As shown in FIG. 2, the motor control portion 200 acquires a speed command value wt (the rotation speed designated for the brushless DC motor 20) that is input via an input port 205, and a U phase current value iu, a V phase current value iv, and a W phase current value iw that are input via an input port 210. Then, the motor control portion 200 obtains a U-phase current operation amount vu, a V-phase current operation amount vv, and a W-phase current operation amount vw for driving the brushless DC motor 20 based on the speed command value wt, the U phase current value iu, the V phase current value iv, and the W phase current value iw. Then the motor control portion 200 outputs the obtained U-phase current operation amount vu, V-phase current operation amount vv, and W-phase current operation amount vw to the brushless DC motor 20 via an output port 290. In the case where the processing portion 100 is configured to include a controller that performs drive control on the brushless DC motor 20, the U-phase current operation amount vu, the V-phase current operation amount vv, and the W-phase current operation amount vw may be output to the controller. As used herein, the term "current operation amount" refers to a voltage command value that indicates the voltage that needs to be applied. The motor control portion 200 achieves stable rotation of the brushless DC motor 20 by repeating the operations described above at a specified cycle (rotation control cycle). In the description given below, the rotation control cycle is set to 50 µs, but is not limited to this value.

Also, the motor control portion 200 performs processing for detecting a loss of synchronism in the brushless DC motor 20 (loss-of-synchronism detection processing) based on the U phase current value iu, the V phase current value iv, and the W phase current value iw input through the input port 210. Then, the motor control portion 200 outputs a result of the loss-of-synchronism detection processing to the control portion 120 as a notification signal 255. The motor control portion 200 repeats the loss-of-synchronism detection processing described above at a specified cycle (loss-of-synchronism detection cycle), and thereby realizes a rapid loss-of-synchronism detection. In order to quickly detect a loss of synchronism, the loss-of-synchronism detection cycle is set to be less than or equal to half of the rotation control cycle. In the description given below, the loss-of-synchronism detection cycle is set to 1 µs, but is not limited to this value.

Next, the functional portions of the motor control portion 200 will be described. In the present embodiment, among the functional portions shown in FIG. 2, a converter 220 and a loss-of-synchronism detector 250 are realized by a custom LSI that is a hardware portion 21 that operates at the loss-of-synchronism detection cycle. On the other hand, a converter 230, an estimation computator 240, a controller 260, a converter 270, and a converter 280 are realized by software (computer program) that is a software portion 22 that is executed by the processor at the rotation control cycle. As described above, the software is stored in the memory included in the control portion 120.

In the present embodiment, the hardware portion 21 is realized using a custom LSI, and the software portion 22 is realized using software, but the form of realization of the hardware portion 21 and the software portion 22 is not limited to a specific form of realization.

Here, a limitation on the control cycle will be described. There needs to be a limitation so that the computation related to the sensorless vector control ends within the rotation control cycle (50 µs in the present embodiment). The load applied to the processor increases significantly if the loss-of-synchronism detection processing is added and executed highly frequently. Particularly in the case where an inexpensive processor is used to reduce the cost of the product, the processor performance is insufficient. Accordingly, as described above, a custom LSI may be used in combination to bear the load on the processor. On the other hand, the accuracy of loss-of-synchronism detection can be increased as the loss-of-synchronism detection cycle is set to be shorter, but it is not possible to reduce the loss-of-synchronism detection cycle to be shorter than the sampling cycle of the AD converters used for current measurement.

The converter 220 obtains an α-axis current value is and a β-axis current value ib by performing phase conversion processing on the U phase current value iu, the V phase current value iv, and the W phase current value iw that were input from the brushless DC motor 20 via the input port 210. As described above, in the case where the processing portion 100 is configured to include a controller that performs drive control on the brushless DC motor 20, the converter 220 acquires the U phase current value iu, the V phase current value iv, and the W phase current value iw from the controller of the brushless DC motor 20 via the input port 210. Here, the α axis and the β axis are the axes of a stationary coordinate system. For example, the α axis can be set to any phase direction, for example, a U phase direction, and the β axis can be set to a direction perpendicular to the α axis. It is also possible to obtain ia and ib from two phase current values arbitrarily selected from iu, iv, and iw. The converter 220 executes the phase conversion processing at a cycle that is the same as or shorter than the loss-of-synchronism detection cycle of the loss-of-synchronism detector 250.

The converter 230 obtains a d-axis current value id and a q-axis current value iq by performing, on the α-axis current ia and the β-axis current value ib, coordinate rotation processing that uses elements (sin θe and cos θe) of a rotation matrix relative to a phase (a phase difference between the α axis and the d axis) from the estimation computator 240. Here, the d axis and the q axis are the axes of a rotating coordinate system. For example, the d axis can be set to a predetermined direction of the rotor, for example, an N polar direction, and the q axis can be set to a direction perpendicular to the d axis.

The controller 260 determines a q-axis current command value for adjusting the rotation speed of the brushless DC motor 20 from the speed command value wt input via the input port 205 and an estimated speed we of the brushless DC motor 20 that is output from the estimation computator 240. Then, the controller 260 obtains a d-axis current operation amount vd and a q-axis current operation amount vq from the q-axis current command value, the d-axis current value id, and the q-axis current value iq, and outputs the obtained d-axis current operation amount vd and q-axis current operation amount vq to the converter 270.

The converter 270 obtains an α-axis current operation amount va and a β-axis current operation amount vb by performing, on the d-axis current operation amount vd and the q-axis current operation amount vq, coordinate rotation processing that uses the elements (sin θe and cos θe) described above from the estimation computator 240.

The converter 280 obtains a U-phase current operation amount vu, a V-phase current operation amount vv, and a W-phase current operation amount vw by performing phase conversion processing on the α-axis current operation amount va and the β-axis current operation amount vb. Then, the converter 280 outputs the U-phase current operation amount vu, the V-phase current operation amount vv, and the W-phase current operation amount vw to the brushless DC motor 20 via the output port 290. As described above, in the case where the processing portion 100 is configured to include a controller that performs drive control on the brushless DC motor 20, the U-phase current operation amount vu, the V-phase current operation amount vv, and the W-phase current operation amount vw may be output to the controller.

The estimation computator 240 obtains the estimated speed we of the brushless DC motor 20 and the elements (sin θe and cos θe) described above from the α-axis current operation amount va, the β-axis current operation amount vb, the α-axis current value ia, and the β-axis current value ib. Then, the estimation computator 240 outputs the obtained estimated speed we to the controller 260, and outputs the obtained elements (sin θe and cos θe) to the converter 230 and the converter 270. Filters or the like may be added between computation operations within the estimation computator 240 so as to remove noise components.

The loss-of-synchronism detector 250 performs, based on the α-axis current value ia and the β-axis current value ib obtained by the converter 220, loss-of-synchronism detection processing for detecting whether or not the brushless DC motor 20 is in a loss-of-synchronism state. When the load on the brushless DC motor 20 varies, the amplitude and phase of the α-axis current value ia and the β-axis current value ib change accordingly. The loss-of-synchronism detector 250 measures a radius vector R, which is obtained by performing polar coordinate transformation on the α-axis current value ia and the β-axis current value ib, for a specified measurement time period (for example, 100 μs), and determines that a loss of synchronism has occurred if the range of variation of the measured radius vector R exceeds a specified threshold value, or if a statistically significant change occurs. The threshold value may be set according to the characteristics of a paper conveying system of the image forming apparatus 10, and it is possible to set a plurality of threshold values. In the case where the loss-of-synchronism detector 250 is realized using an FPGA or a custom LSI, it is desirable that the loss-of-synchronism detector 250 is configured using a register that can change the threshold value as needed, or the like.

Alternatively, the loss-of-synchronism detector 250 measures an angle of deviation θ, which is obtained by performing the polar coordinate transformation on the α-axis current value ia and the β-axis current value ib, for a specified measurement time period (for example, 100 μs), and determines that a loss of synchronism has occurred if the degree of similarity between the waveform of the angle of deviation θ and a normal waveform falls below a threshold value. As used herein, the normal waveform refers to the waveform of the angle of deviation θ obtained by measuring, for a specified measurement time period (for example, 100 μs), an angle of deviation θ obtained by performing the polar coordinate transformation on the α-axis current value ia and the β-axis current value ib of the brushless DC motor 20 in which there is no loss of synchronism. The loss-of-synchronism detector 250 may be configured to determine that a loss of synchronism has occurred if a statistically significant change occurs in the waveform of the angle of deviation θ. Alternatively, the loss-of-synchronism detector 250 may be configured to determine that a loss of synchronism has occurred if, for example, the amount of change in the angle of deviation θ falls below a specified threshold value.

Alternatively, the loss-of-synchronism detector 250 may be configured to perform the loss-of-synchronism detection processing, using a radius vector R or an angle of deviation θ obtained through polar coordinate transformation processing (faster polar coordinate transformation processing) that is simpler than the above-described polar coordinate transformation processing. For example, the loss-of-synchronism detector 250 may be configured to obtain the radius vector R or the angle of deviation θ by performing polar coordinate transformation after the number of representation bits of the α-axis current value is and the β-axis current value ib has been reduced. Alternatively, for example, the loss-of-synchronism detector 250 may be configured to obtain the radius vector R or the angle of deviation θ by performing phase conversion and polar coordinate transformation after the number of representation bits of the U phase current value iu, the V phase current value iv, and the W phase current value iw has been reduced.

Then, if the loss-of-synchronism detector 250 detects a loss of synchronism in the brushless DC motor 20 through the loss-of-synchronism detection processing described above, the loss-of-synchronism detector 250 outputs a notification signal 255 that indicates that a loss of synchronism has been detected to the control portion 120. For example, a request for interruption processing is transmitted to the processor that realizes the control portion 120. The control portion 120 that has received the notification signal 255 performs loss-of-synchronism detection processing that is more accurate than that performed by the loss-of-synchronism detector 250. The more accurate loss-of-synchronism detection processing is performed at, for example, the rotation control cycle.

Figure 3:
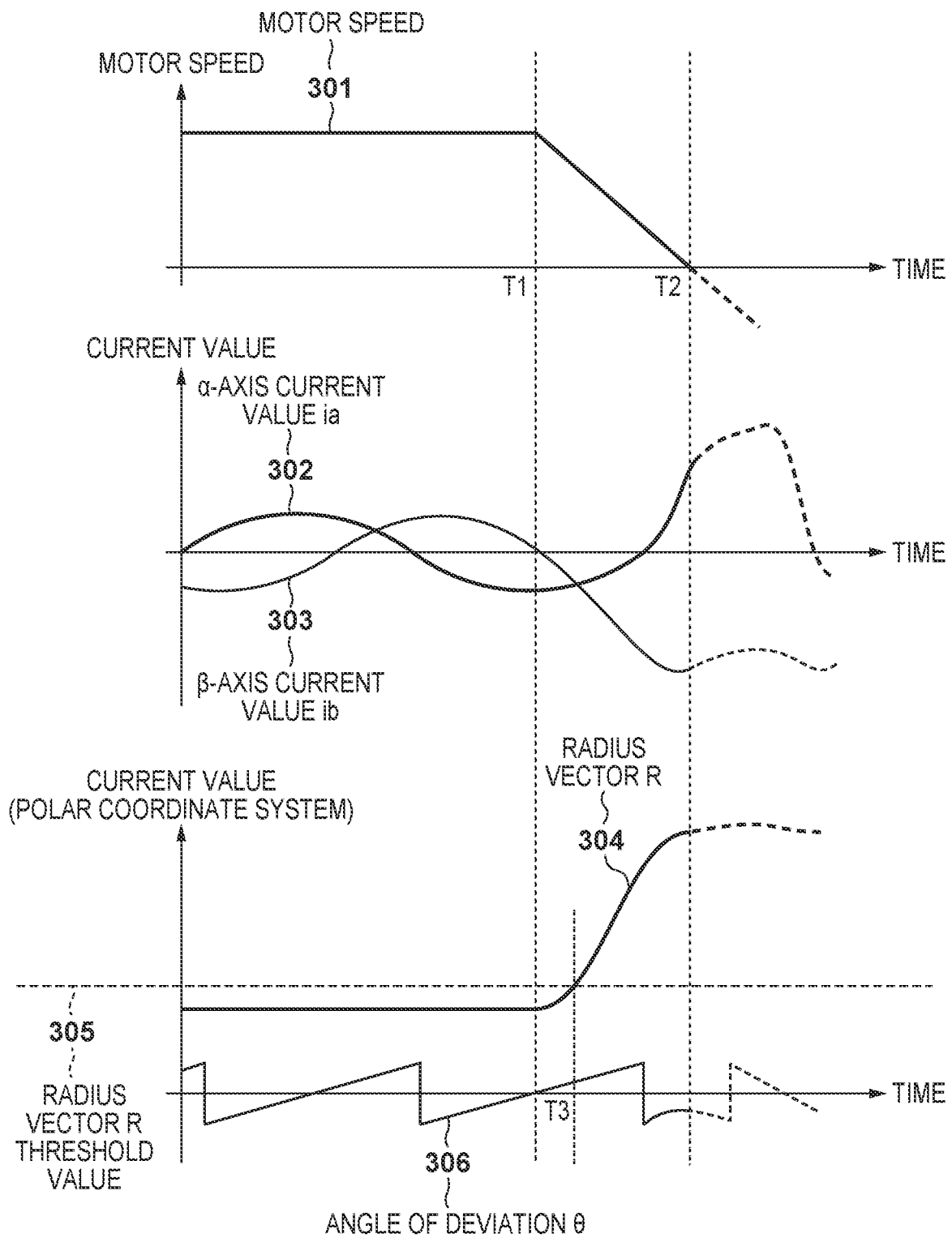
FIG. 3 is a diagram showing theoretical changes in a motor speed 301, an $\alpha$-axis current value is 302, a $\beta$-axis current value ib 303, a radius vector R 304, and an angle of deviation $\theta$ 306.

Next is a description of theoretical changes in a rotation speed (motor speed) 301, an α-axis current value ia 302, a β-axis current value ib 303, a radius vector R 304, and an angle of deviation θ 306 of the brushless DC motor 20 when a variation occurs in the load under sensorless vector control, with reference to FIG. 3. The radius vector R 304 and the angle of deviation θ 306 are obtained by performing polar coordinate transformation on the α-axis current value ia 302 and the β-axis current value ib 303.

At time T1, a load that simulates a paper jam is applied to the brushless DC motor 20 performing normal rotation under a steady state load, as a result of which the brushless DC motor 20 stops at time T2. After time T2, control ceases, and thus the sensorless vector control does not actually work. The time between time T1 and time T2 is about 4 ms, and in order to avoid a situation in which the brushless DC motor 20 becomes uncontrollable due to a loss of synchronism, it is necessary to perform loss-of-synchronism detection processing during this time period.

The loss-of-synchronism detection processing utilizes a phenomenon in which the radius vector R 304, which is obtained by performing polar coordinate transformation on the α-axis current value ia 302 and the β-axis current value ib 303, increases when a loss of synchronism occurs. When a loss of synchronism occurs due to a paper jam or the like, and the motor speed 301 decreases, the counter electromotive voltage in the brushless DC motor 20 decreases. Along with this, the U phase current value iu, the V phase current value iv, and the W phase current value iw that are input through the input port 210 increase, and eventually the radius vector R 304 increases. That is, it is possible to detect whether or not a loss of synchronism has occurred by measuring various current values.

Accordingly, in the present embodiment, a radius vector R threshold value 305 is set for the radius vector R 304. From time T3 at which the radius vector R 304 exceeds the radius vector R threshold value 305, the loss-of-synchronism detector 250 starts measuring the α-axis current value ia 302 and the β-axis current value ib 303 in order to detect a loss of synchronism. Then, each time the loss-of-synchronism detector 250 measures the α-axis current value ia 302 and the β-axis current value ib 303, the loss-of-synchronism detector 250 performs polar coordinate transformation on the measured α-axis current value ia 302 and β-axis current value ib 303, and thereby obtains a radius vector R 304 and an angle of deviation θ 306. When the measurement of the α-axis current value ia 302 and the β-axis current value ib 303 is performed a specified number of times (for example, 100 times), 100 sets of the radius vector R 304 and the angle of deviation θ 306 can be obtained. Then, if it is statistically indicated that the radius vector R 304 has exceeded the radius vector R threshold value 305 based on 100 radius vectors R 304 obtained above, the loss-of-synchronism detector 250 determines that a loss of synchronism has occurred. For example, in order to remove the effect of noise, the loss-of-synchronism detector 250 determines that a loss of synchronism has occurred in the brushless DC motor 20 if the arithmetic average value of 100 radius vectors R 304 exceeds the radius vector R threshold value 305 (if Equation 1 given below is satisfied).

$$Rth < 1/100 \times \Sigma_{n=1}^{100} Rn \qquad \text{(Equation 1)}$$

In the equation, Rn represents the radius vector R 304 obtained by performing polar coordinate transformation on the α-axis current value ia 302 and the β-axis current value ib 303 obtained by performing measurement n times (where n is 1≤n≤100). Rth represents the radius vector R threshold value 305, and is the maximum value of radius vector R that is permitted in the paper conveying system of the image forming apparatus 10. The arithmetic average value may be determined sequentially each time current value measurement is performed in order to perform calculation with a smaller amount of memory. In the case where there is a large amount of noise, and it is possible to prepare a memory capable of storing data corresponding to the number of current measurements performed, a median value may be used instead of the arithmetic average value in order to reduce the effect of an outlier.

Alternatively, the loss-of-synchronism detector 250 may be configured to determine that a loss of synchronism has occurred if at least 50 out of 100 radius vectors R 304 (or in other words, at least half of the measured radius vectors R 304) exceed the radius vector R threshold value 305.

Alternatively, the loss-of-synchronism detector 250 may perform the loss-of-synchronism detection processing by utilizing the fact that the value of the radius vector R 304 is substantially constant while the rotation of the brushless DC motor 20 is stable. For example, the loss-of-synchronism detector 250 totals an absolute value (the absolute value of the range of variation of the radius vector R 304) An of the difference between a radius vector R 304 (Rn−1) obtained through the previous measurement and a radius vector R 304 (Rn) obtained through the current measurement by changing n from 2 to 100. Then, if the result of totaling exceeds a specified threshold value Sth (a specified upper limit value of current variation per number of measurements that is permitted in the paper conveying system of the image forming apparatus 10) (if Equation 2 given below is satisfied), the loss-of-synchronism detector 250 determines that a loss of synchronism has occurred in the brushless DC motor 20.

$$Sth < \Sigma_{n=2}^{100} |Rn - Rn-1| \qquad \text{(Equation 2)}$$

Alternatively, the loss-of-synchronism detector 250 may be configured to determine that a loss of synchronism has occurred if the arithmetic average value of the amplitude of either one or both of the measured α-axis current value is and β-axis current value ib within a specified measurement time period exceeds a specified threshold value.

Alternatively, the loss-of-synchronism detector 250 may be configured to detect the occurrence of a loss of synchronism by utilizing the fact that the angular velocity of the angle of deviation θ 306 decreases when a loss of synchronism occurs. For example, the loss-of-synchronism detector 250 obtains the absolute value of the difference between the angular velocity of the angle of deviation θ while the rotation of the brushless DC motor 20 is stable and the average angular velocity of the angle of deviation θ 306 obtained from the current values obtained by performing measurement a specified number of times (for example, 100 times). Then, the loss-of-synchronism detector 250 determines that a loss of synchronism has occurred in the brushless DC motor 20 if the obtained absolute value exceeds a specified threshold value.

The sampling cycle of the AD converters used for current measurement can be generally set to about 1 μs. For example, as described above, in the case where 100 current measurement values are used to detect a loss of synchronism, the delay time is 100 μs, and it is therefore possible to detect a loss of synchronism sufficiently earlier than time T2. On the other hand, in the case where the loss-of-synchronism detection is performed at the rotation control cycle (50 μs), the current value measurement can be performed only a couple of times within the delay time period (100 μs), and it is therefore difficult to make a reliable determination under conditions where there is noise. By setting the loss-of-synchronism detection cycle independent of the rotation control cycle as in the present embodiment, it is possible to achieve a highly reliable loss-of-synchronism detection with a shorter delay time.

Some or all of the functions of the loss-of-synchronism detector 250 described above may be realized using software. The software may be executed by a processor provided separately from the processor of the control portion 120, or may be executed by the processor of the control portion 120. However, the cycle at which control for detecting the occurrence of a loss of synchronism is performed is different from the control cycle of the software portion 22, and thus when the software is executed by the same processor, the control operations need to be performed independent of each other as separate tasks. That is, a high-performance processor is required as compared with the case where a custom LSI and a processor are used in combination.

Figure 8:
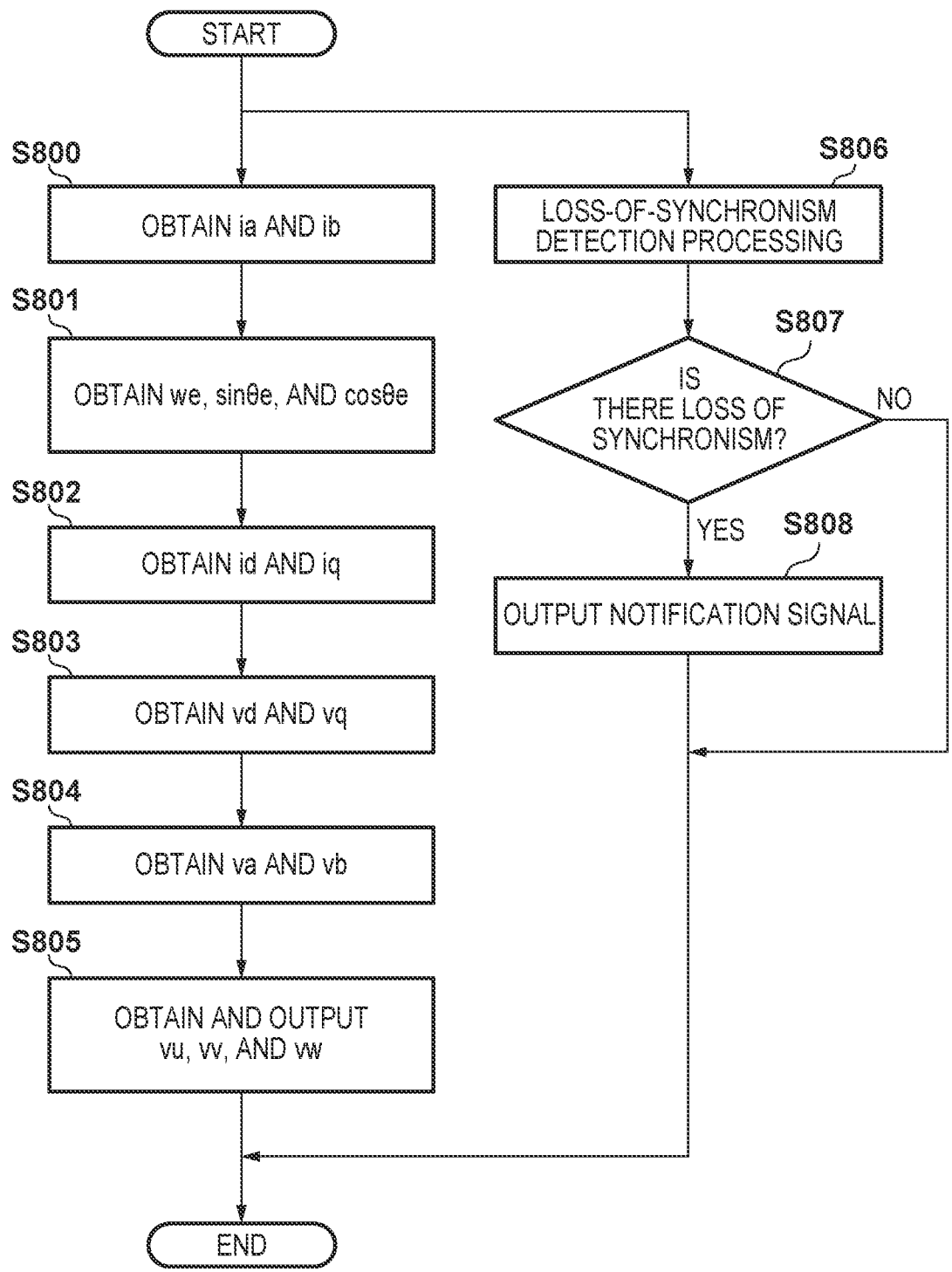
FIG. 8 is a flowchart illustrating operations performed by the motor control portion 200.

A description will now be given of operations performed by the motor control portion 200 described above, with reference to the flowchart shown in FIG. 8. The processing performed in steps S800 to S805 is processing related to the sensorless vector control, and as described above, the processing is executed at the rotation control cycle. On the other hand, the processing performed in steps S806 to S808 is processing related to the loss-of-synchronism detection, and as described above, the processing is executed at the loss-of-synchronism detection cycle. It is assumed here that the processing in steps S800 to S805 and the processing in steps S806 to S808 are performed in parallel.

In step S800, the converter 220 obtains the α-axis current value ia and the β-axis current value ib by performing phase conversion processing on the U phase current value iu, the V phase current value iv, and the W phase current value iw input via the input port 210.

In step S801, the estimation computator 240 obtains the estimated speed we of the brushless DC motor 20 and the elements (sin θe and cos θe) described above from the α-axis current operation amount va, the β-axis current operation amount vb, the α-axis current value ia, and the β-axis current value ib.

In step S802, the converter 230 performs, on the α-axis current ia and the β-axis current value ib, coordinate rotation processing that uses the elements (sin θe and cos θe) of a rotation matrix with respect to a phase (a phase difference between the α axis and the d axis) from the estimation computator 240. As a result, the converter 230 obtains the d-axis current value id and the q-axis current value iq.

In step S803, the controller 260 determines the q-axis current command value for adjusting the rotation speed of the brushless DC motor 20 from the speed command value wt and the estimated speed we. Then, the controller 260 obtains the d-axis current operation amount vd and the q-axis current operation amount vq from the q-axis current command value, the d-axis current value id, and the q-axis current value iq.

In step S804, the converter 270 obtains the α-axis current operation amount va and the β-axis current operation amount vb by performing, on the d-axis current operation amount vd and the q-axis current operation amount vq, coordinate rotation processing that uses the elements (sin θe and cos θe) described above from the estimation computator 240.

In step S805, the converter 280 obtains the U-phase current operation amount vu, the V-phase current operation amount vv, and the W-phase current operation amount vw by performing phase conversion processing on the α-axis current operation amount va and the β-axis current operation amount vb. Then, the converter 280 outputs the U-phase current operation amount vu, the V-phase current operation amount vv, and the W-phase current operation amount vw via the output port 290.

In step S806, the loss-of-synchronism detector 250 performs loss-of-synchronism detection processing for detecting whether or not the brushless DC motor 20 is in a loss-of-synchronism state based on the α-axis current value ia and the β-axis current value ib obtained by the converter 220. If the loss-of-synchronism detector 250 detects a loss of synchronism in the brushless DC motor 20, the processing advances to S808 via step S807, and if the loss-of-synchronism detector 250 does not detect a loss of synchronism in the brushless DC motor 20, the processing ends via step S807. In step S808, the loss-of-synchronism detector 250 outputs a notification signal 255 indicating that a loss of synchronism has been detected to the control portion 120.

Next, a functional configuration example of the functional portions of the control portion 120 that execute high accuracy loss-of-synchronism detection processing in response to the notification from the notification signal 255 will be described with reference to the block diagram shown in FIG. 4. In the control portion 120 shown in FIG. 4, the functional portions other than the motor control portion 200 may be realized using hardware, or may be realized using software. In the case of the latter, the software is stored in the memory of the control portion 120 and executed by the processor of the control portion 120.

The motor control portion 200 outputs, to a speed comparator 402, an estimated speed we 401 of the brushless DC motor 20 estimated by the estimation computator 240. The speed comparator 402 receives, in addition to the estimated speed we 401 from the motor control portion 200, a speed command value wt via the input port 205.

The speed comparator 402 obtains the absolute value of the difference between the estimated speed we 401 from the motor control portion 200 and the speed command value wt input via the input port 205, as a speed difference 403, and outputs the obtained speed difference 403 to a loss-of-synchronism detector 404. The speed comparator 402 may be configured to perform processing for obtaining the speed difference at the rotation control cycle, or perform the processing only when the notification signal 255 is received from the motor control portion 200.

The loss-of-synchronism detector 404 receives the notification signal 255 from the motor control portion 200, and determines that a loss of synchronism has occurred in the brushless DC motor 20 if the speed difference 403 exceeds a specified threshold value.

The method of detecting a loss of synchronism performed by the control portion 120 is not limited to the method described above, and it is possible to combine, for example, a method (for example, Japanese Patent Laid-Open No. 2014-147239) in which a loss of synchronism is detected by the control portion 120 based on the frequency components of current values input through the input port 210. A functional configuration example of the functional portions of the control portion 120 that execute loss-of-synchronism detection processing based on frequency components of current values will be described with reference to the block diagram shown in FIG. 5. In the control portion 120 shown in FIG. 5, the functional portions other than the motor control portion 200 may be realized using hardware, or may be realized using software. In the case of the latter, the software is stored in the memory of the control portion 120, and executed by the processor of the control portion 120.

The motor control portion 200 outputs, to a calculator 502, a set of the U phase current value iu, the V phase current value iv, and the W phase current value iw input through the input port 210, or a set of the α-axis current value is and the β-axis current value ib obtained from the above set through the processing described above, as a set 501.

The calculator 502 obtains the frequency component of each current value included in the set 501, and outputs frequency components 503 obtained for each current value to a loss-of-synchronism detector 504. The frequency component computation of the calculator 502 may be performed at the rotation control cycle, or may be performed only when the notification signal 255 is received from the motor control portion 200.

The loss-of-synchronism detector 504 receives the notification signal 255 from the motor control portion 200, and determines that a loss of synchronism has occurred in the brushless DC motor 20 if the frequency component of any one of the current values has a frequency greater than or equal to a specified frequency.

As described above, different loss-of-synchronism detection processing operations are performed between the loss-of-synchronism detector 250 and the loss-of-synchronism detector 404 (504). For example, the method disclosed in Japanese Patent Laid-Open No. 2008-220169 may be used. In order to further increase the accuracy of loss-of-synchronism detection, the plurality of detection methods described above may be used in combination. However, when a plurality of methods are used in combination, the accuracy of loss-of-synchronism detection is improved, but the amount of calculation required also increases. Accordingly, it is necessary to determine an appropriate combination according to the device characteristics of the image forming apparatus 10 and what kind of processor, FPGA or custom LSI is used to realize the control portion 120 and the motor control portion 200.

Operations performed by the control portion 120 described above will be described with reference to the flowchart shown in FIG. 6. In step S601, the control portion 120 provides the speed command value wt (target speed) to the motor control portion 200, and performs motor rotation control on the brushless DC motor 20 through sensorless vector control (steps S800 to S805 shown in FIG. 8).

Then, if the notification signal 255 is output from the loss-of-synchronism detector 250 in the motor control portion 200, the processing advances to step S603 via step S602, and if the notification signal 255 is not output, the processing returns to step S601 via step S602.

In step S603, loss-of-synchronism detection processing that is more precise than that performed by the loss-of-synchronism detector 250 is performed by the loss-of-synchronism detector 404 and the speed comparator 402 while continuing the above-described motor rotation control on the brushless DC motor 20 through sensorless vector control. In step S603, the loss-of-synchronism detection processing that is more precise than that performed by the loss-of-synchronism detector 250 may be performed by the calculator 502 and the loss-of-synchronism detector 504, instead of the loss-of-synchronism detector 404 and the speed comparator 402.

At this time, if the calculation power of the processor is insufficient for the control portion 120 to perform loss-of-synchronism detection, in order to give a higher priority to loss-of-synchronism detection control, the priority of sensorless vector control may be reduced, or simple rotation control that requires a smaller amount of computation may be used substitutionally.

Then, if the loss-of-synchronism detector 404 (504) determines that a loss of synchronism has occurred in the brushless DC motor 20 (if it is reliably determined that a loss of synchronism has occurred), the processing advances to step S605 via step S604. On the other hand, if the loss-of-synchronism detector 404 (504) determines that a loss of synchronism has not occurred in the brushless DC motor 20 (if it is not reliably determined that a loss of synchronism has occurred), the processing returns to step S601 via step S604.

In step S605, the control portion 120 ends the sensorless vector control, and performs a control operation for stopping the brushless DC motor 20. In the control operation, the electric current supplied to the brushless DC motor 20 may be forcibly interrupted, or the current value of electric current supplied to the brushless DC motor 20 may be changed to a fixed value that is lower than the current value. Alternatively, it is also possible to apply a brake or the like that physically stops the rotation of the brushless DC motor 20.

In the present embodiment, an example has been described in which the loss-of-synchronism detection processing is performed using either one of the radius vector R and the angle of deviation θ, but the loss-of-synchronism detection processing may be performed using both the radius vector R and the angle of deviation θ. For example, the loss-of-synchronism detector 250 may be configured to, if the result of the loss-of-synchronism detection processing on each of the radius vector R and the angle of deviation θ indicates that a loss of synchronism has occurred, determine that a loss of synchronism has occurred, and output a notification signal 255.

Second Embodiment

Hereinafter, a difference from the first embodiment will be described, and it is therefore assumed that the second embodiment has the same configuration as the first embodiment unless otherwise stated. In the first embodiment, an example has been described in which loss-of-synchronism detection processing that is more accurate than the loss-of-synchronism detection processing performed by the loss-of-synchronism detector 250 is performed by a functional portion of the control portion 120 that is different from the motor control portion 200. In the present embodiment, loss-of-synchronism detection processing that is more accurate than the loss-of-synchronism detection processing performed by the loss-of-synchronism detector 250 is performed in the motor control portion 200.

Figure 7:
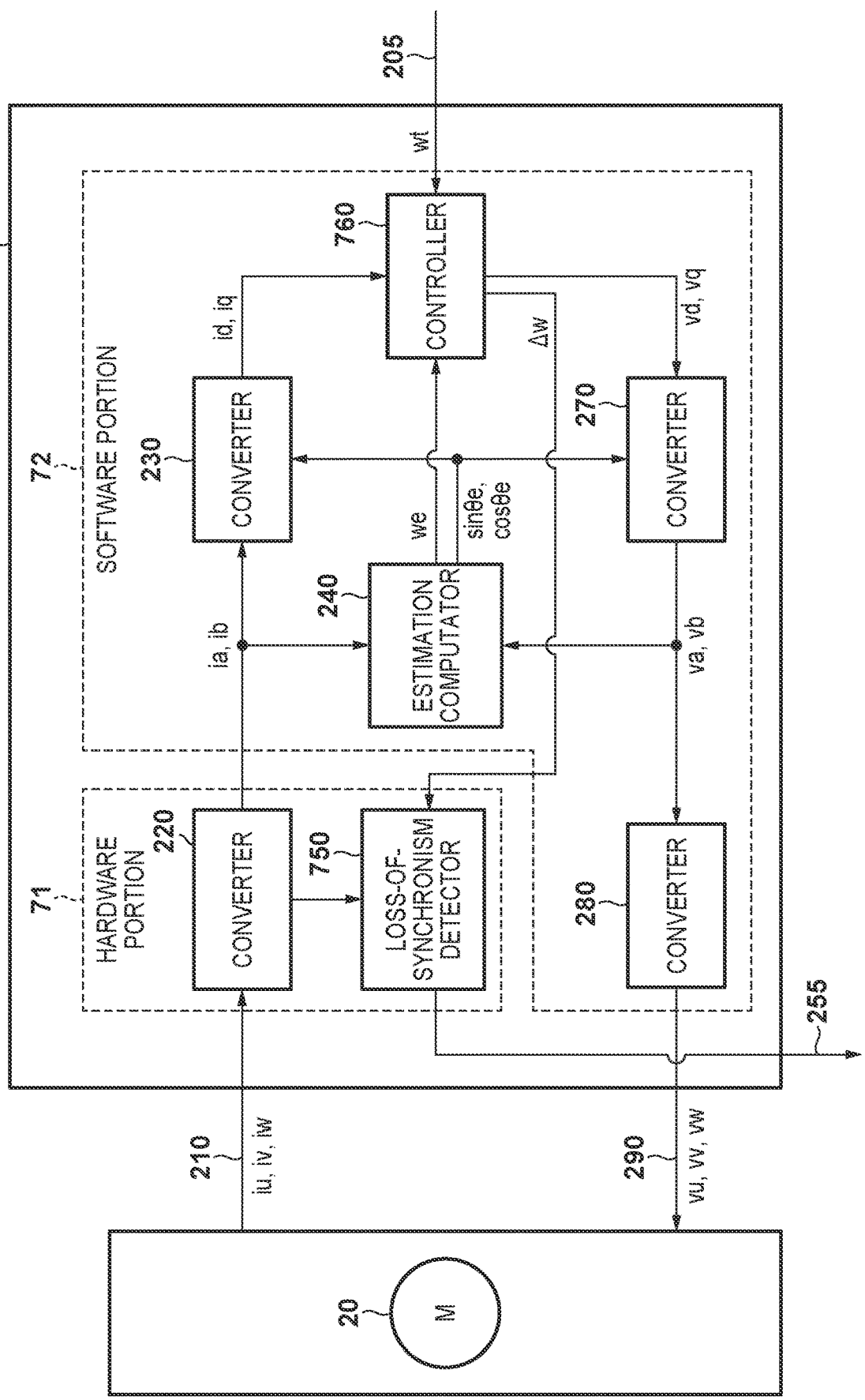
FIG. 7 is a block diagram showing a functional configuration example of a motor control portion 700.

In the present embodiment, the control portion 120 includes a motor control portion 700 shown in FIG. 7 instead of the motor control portion 200. Hereinafter, the motor control portion 700 will be described, focusing on a difference from the motor control portion 200.

A loss-of-synchronism detector 750 has the function of the loss-of-synchronism detector 250 and the function of the loss-of-synchronism detector 404 described above. A controller 760 has, in addition to the function of the controller 260 described above, a function of obtaining the absolute value of the difference between the estimated speed we from the estimation computator 240 and the speed command value wt input via the input port 205 as a speed difference Δw, and outputting the obtained speed difference Δw to the loss-of-synchronism detector 750. A hardware portion 71 performs operations at the loss-of-synchronism detection cycle, and a software portion 72 performs operations at the rotation control cycle. However, in the case where the loss-of-synchronism detector 750 is configured to function as the loss-of-synchronism detector 404, the loss-of-synchronism detector 750 may perform operations at the rotation control cycle.

The loss-of-synchronism detector 750 normally operates as the loss-of-synchronism detector 250 (performs loss-of-synchronism detection processing at the loss-of-synchronism detection cycle), but upon detecting a loss of synchronism, the loss-of-synchronism detector 750 operates as the loss-of-synchronism detector 404 (performs loss-of-synchronism detection processing at the rotation control cycle), using the speed difference Δw from the controller 760. Then, if, as a result of performing operation as the loss-of-synchronism detector 404, the loss-of-synchronism detector 750 detects a loss of synchronism, the loss-of-synchronism detector 750 outputs a notification signal 255 to the control portion 120. In this case, the likelihood of an occurrence of a loss of synchronism of which a notification is made by the notification signal 255 is higher than that of the first embodiment, and thus the control portion 120 that has received the notification indicating the detection of a loss of synchronism quickly ends the sensorless vector control, and performs an operation for stopping the motor.

In the present embodiment, the functions of the speed comparator 402 and the loss-of-synchronism detector 404 shown in FIG. 4 are incorporated in the motor control portion 200, but the functions of the calculator 502 and the loss-of-synchronism detector 504 shown in FIG. 5 may be incorporated in the motor control portion 200.

The numerical values used to describe the embodiments above are merely examples to describe the embodiments specifically, and thus the embodiments described above are not limited to these numerical values. Also, some or all of the embodiments described above may be combined as appropriate, or some or all of the embodiments described above may be used selectively. Not all combinations of features described in the embodiments given above are necessarily essential.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-242875, filed Dec. 19, 2017, which is hereby incorporated by reference herein in its entirety.

What is claimed is:
1. A motor control apparatus comprising:
at least one of:
one or more circuits: or
one or more processors and at least one memory, the at least one memory being coupled to the one or more processors and having stored thereon instructions executable by the one or more processors,
wherein at least one of the one or more circuits or execution of the instructions causes the motor control apparatus to function as:
a control unit configured to perform a first processing at a first cycle, in which a rotation speed of a motor is estimated based on a current value of the motor to perform rotation control on the motor; and
a detection unit configured to perform a second processing at a second cycle that is shorter than the first cycle, in which a decrease of the rotation speed of the motor is detected as a loss of synchronism in the motor based on the current value.

2. The motor control apparatus according to claim 1,
wherein the detection unit performs the second processing based on a radius vector obtained by performing polar coordinate transformation on the current value at the second cycle.

3. The motor control apparatus according to claim 1,
wherein the detection unit performs the second processing based on an angle of deviation obtained by performing polar coordinate transformation on the current value at the second cycle.

4. The motor control apparatus according to claim 1, wherein the at least one of the one or more circuits or the execution of the instructions causes the motor control apparatus to function as:
a second detection unit configured to perform processing for detecting the loss of synchronism in the motor more accurately than the detection unit when the detection unit detects the loss of synchronism in the motor.

5. The motor control apparatus according to claim 4,
wherein the second detection unit determines that the loss of synchronism has occurred in the motor when an absolute value of a difference between an estimated speed of the motor and a rotation speed designated for the motor exceeds a threshold value.

6. The motor control apparatus according to claim 1,
wherein the second cycle is less than or equal to half of the first cycle.

7. The motor control apparatus according to claim 1, wherein the at least one of the one or more circuits or the execution of the instructions causes the motor control apparatus to function as:
a conversion unit configured to perform processing at a cycle being equal to or shorter than the second cycle, in which phase conversion processing on three phase current values of the motor is performed to obtain the current value,
wherein, in the first processing, the rotation speed of the motor is estimated based on the current value that the control unit obtains at the first cycle from the conversion unit, and
wherein, in the second processing, the decrease of the rotation speed of the motor is detected based on the current value that the detection unit obtains at the second cycle from the conversion unit.

8. The motor control apparatus according to claim 1,
wherein the detection unit is realized using a custom LSI or an FPGA.

9. The motor control apparatus according to claim 1,
wherein the motor is a motor for driving a photoconductive drum and a transfer belt in an image forming apparatus.

10. An image forming apparatus comprising:
a motor; and
a motor control apparatus including:
at least one of:
one or more circuits; or
one or more processors and at least one memory, the at least one memory being coupled to the one or more processors and having stored thereon instructions executable by the one or more processors,
wherein at least one of the one or more circuits or the execution of the instructions causes the motor control apparatus to function as:
a control unit configured to perform first processing at a first cycle, in which a rotation speed of a motor is estimated based on a current value of the motor to perform rotation control on the motor; and
a detection unit configured to perform second processing at a second cycle that is shorter than the first cycle, in which decrease of the rotation speed of the motor is detected as a loss of synchronism in the motor based on the current value.

11. The image forming apparatus according to claim 10,
wherein the motor is a motor for driving a photoconductive drum and a transfer belt in the image forming apparatus.

12. A method for controlling a motor control apparatus, the method comprising:
performing a first processing at a first cycle, in which a rotation speed of a motor is estimated based on a current value of the motor;
performing rotation control on the motor; and
performing a second processing at a second cycle that is shorter than the first cycle, in which decrease of the rotation speed of the motor is detected as a loss of synchronism in the motor based on the current value.

13. The method according to claim 12,
wherein the second processing based on a radius vector obtained by performing polar coordinate transformation on the current value is performed at the second cycle.

14. The method according to claim 12,
wherein the second processing based on an angle of deviation obtained by performing polar coordinate transformation on the current value is performed at the second cycle.

15. The method according to claim 12,
wherein, when the loss of synchronism in the motor is detected, detection processing for detecting the loss of synchronism in the motor is performed more accurately than in the detection.

16. The method for controlling a motor control apparatus according to claim 15,
wherein, in the detection processing, it is determined that the loss of synchronism has occurred in the motor when an absolute value of a difference between an estimated speed of the motor and a rotation speed designated for the motor exceeds a threshold value.

17. The method for controlling a motor control apparatus according to claim 12,
wherein the second cycle is less than or equal to half of the first cycle.

18. The method according to claim 12, further including:
performing processing at a cycle equal to or shorter than the second cycle, in which phase conversion processing on three phase current values of the motor is performed to obtain the current value,
wherein, in the first processing, the rotation speed of the motor is estimated based on the current value that is obtained at the first cycle from the phase conversion processing, and
wherein, in the second processing, the decrease of the rotation speed of the motor is detected based on the current value that is obtained at the second cycle from the phase conversion processing.

19. The method according to claim 12,
wherein the detection of the loss of synchronism in the motor is performed using a custom LSI or an FPGA.

20. The method for controlling a motor control apparatus according to claim 12, wherein the motor is a motor for driving a photoconductive drum and a transfer belt in an image forming apparatus.

\* \* \* \* \*